United States Patent [19]

Dolejs et al.

[11] Patent Number: 4,569,371

[45] Date of Patent: Feb. 11, 1986

[54] AXIAL MULTIPORT ROTARY VALVE

[75] Inventors: Charles A. Dolejs; Gary M. Schumann, both of Arlington Heights; David L. Schick, Mt. Prospect, all of Ill.

[73] Assignee: UOP Inc., Des Plaines, Ill.

[21] Appl. No.: 687,349

[22] Filed: Dec. 28, 1984

[51] Int. Cl.⁴ .......................................... F16K 11/085
[52] U.S. Cl. .............................. 137/625.47; 251/174
[58] Field of Search ...................... 137/625.11, 625.46, 137/625.47; 251/174

[56] References Cited

U.S. PATENT DOCUMENTS

| | | | |
|---|---|---|---|
| 2,946,348 | 7/1960 | North | 137/625.47 |
| 2,972,357 | 2/1961 | Ford et al. | 137/625.47 |
| 2,985,589 | 5/1961 | Broughton et al. | 210/34 |
| 3,040,777 | 6/1962 | Carson et al. | 137/625.15 |
| 3,192,954 | 7/1965 | Gerhold et al. | 137/625.11 |
| 3,422,848 | 1/1969 | Liebman et al. | 137/625.15 |
| 3,542,072 | 11/1970 | Harris et al. | 137/625.47 |
| 3,977,434 | 8/1976 | Albright et al. | 137/625.47 |
| 4,335,745 | 6/1982 | Bouveret et al. | 137/625.47 |
| 4,402,832 | 9/1983 | Gerhold | 210/659 |
| 4,480,662 | 11/1984 | Garrels | 137/625.47 |

FOREIGN PATENT DOCUMENTS

701963 1/1954 United Kingdom ............ 137/625.47

Primary Examiner—Alan Cohan
Assistant Examiner—John A. Rivell
Attorney, Agent, or Firm—Thomas K. McBride; William H. Page, II; Richard J. Cordovano

[57] ABSTRACT

A unitary axial multiport rotary valve capable of accomplishing the simultaneous interconnection of a plurality of conduits in accordance with a previously determined cycle, where any conduit communicates with no more than one other conduit at any one cycle step, or valve index position. The conduits to be interconnected are attached to a hollow stationary body, or stator assembly, which is comprised of three sections, or elements, each of which is cylindrical in form. There are fluid flow channels in a rotating body, or rotor assembly, which is located inside the stator assembly and configured in a manner similar to it. The rotor assembly assumes various positions according to the cycle steps and distributes fluid flowing into and out of the valve, by means of the conduits, in a different manner in each cycle step. There are annular volumes between the rotor and stator assemblies which contain sealing means for prevention of leakage and definition of flow passages.

12 Claims, 13 Drawing Figures

FIG. 8a STEP 1

FIG. 8b STEP 2

AXIAL MULTIPORT ROTARY VALVE

FIELD OF THE INVENTION

This invention relates to apparatus for transferring a plurality of fluid streams among different locations. More particularly, it relates to a unitary multiport rotary valve which is capable of accomplishing the simultaneous interconnection of a plurality of conduits in accordance with a predetermined periodic sequence.

INFORMATION DISCLOSURE

Figure 8A:
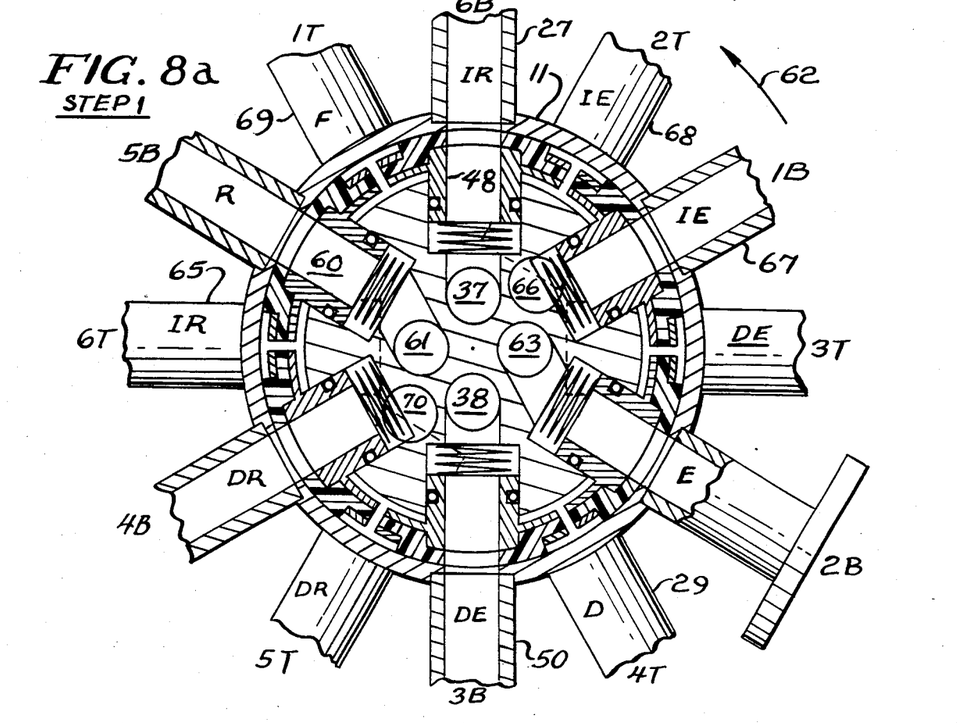
FIGS. 8a and 8b show a section, taken as shown in FIG. 3, of the central elements used in the valve of FIG. 3. Two process steps are shown.
Figure 8B:
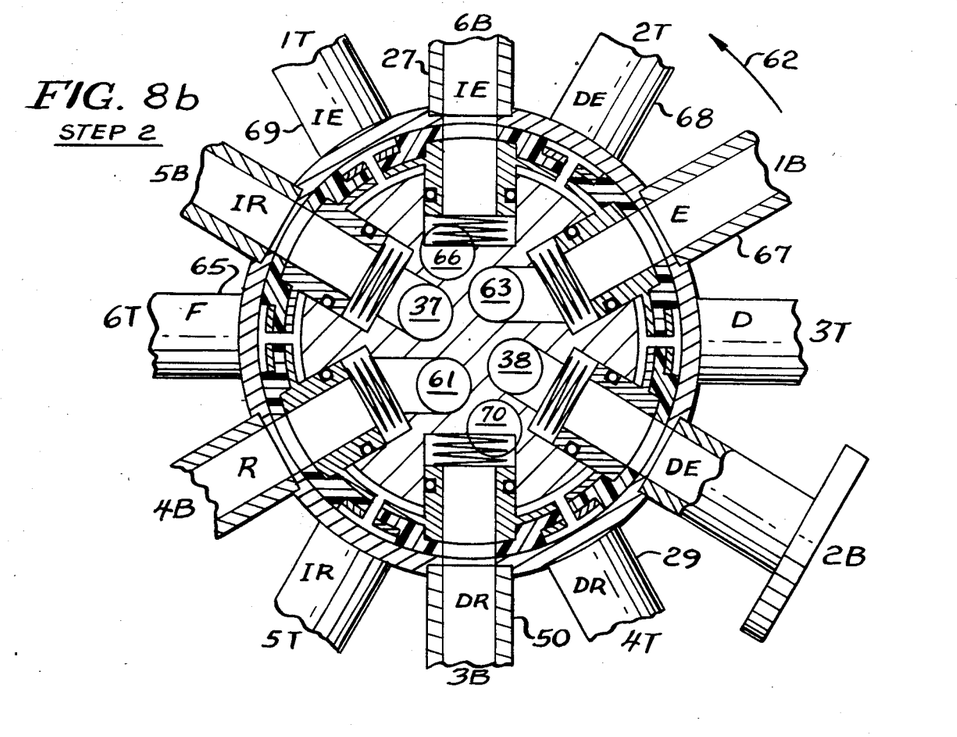

U.S. Pat. Nos. 3,040,777 (Carson et al.) and 3,422,848 (Liebman et al.) describe multiport rotary disc valves which have been used in practicing the process of U.S. Pat. No. 2,985,589 (Broughton el al.), which is described herein, and other similar processes. However, in the practice of a process such as disclosed in U.S. Pat. No. 4,402,832 (Gerhold), which is described below, the valve of these references cannot be utilized. A valve having utility similar to the apparatus of Carson and Liebman is disclosed in U.S. Pat. No. 3,192,954 (Gerhold et al.); this valve employs a cylindrical rotor within a surrounding stator, as exemplified by FIG. 8.

BRIEF SUMMARY OF THE INVENTION

This invention relates to a unitary axial multiport rotary valve useful in transferring a plurality of different fluid streams among different locations in accordance with a previously determined cycle. The fluid streams are contained in conduits which are interconnected by means of the valve. Any conduit communicates with no more than one other conduit at any one cycle step, or valve index position. The conduits to be interconnected are attached to a hollow stationary body, or stator assembly which is comprised of three sections, or elements, each of which is cylindrical in form.

There are fluid flow channels in a rotating body, or rotor assembly, which is located inside the stator assembly and configured in a manner similar to it. The rotor assembly assumes various positions according to the cycle steps and distributes fluid flowing into and out of the valve, by means of the conduits, in a different manner in each cycle step. There are annular spaces, or annular volumes, between the rotor and stator assemblies which contain sealing means for prevention of leakage and definition of flow passages.

There are many instances in which it is necessary to route a fluid stream to one location for a period of time, then to another location for a period of time, and so forth for multiple locations. This relatively simple problem of routing a single fluid stream to various destinations in a previously determined cycle or periodic sequence is easily accomplished with one or more devices such as a multiport rotary plug valve. When it is necessary to simultaneously route more than a single fluid stream to various destinations, it is highly desirable to use a single device rather than numerous individual valves, as discussed in the above-mentioned Carson patent (3,040,777). An axial multiport rotary valve is such a device.

It is among the objects of this invention to provide unitary mechanical valve apparatus for simultaneously accomplishing the interconnection of a plurality of conduits in accordance with a previously determined cycle, where any conduit communicates with no more than one other conduit at any one valve index position. It is also among the objectives to provide a valve smaller in physical size and having fewer maintenance requirements than prior art valves. A broad embodiment of the invention is a valve comprising: (a) a stator assembly having a hollow interior and being comprised of a central element, a first end element, and a second end element, each of said elements having a cylindrical form; (b) a rotor assembly comprised of a central element, a first end element, and a second end element, each of said elements having a cylindrical form, which rotor assembly is located substantially inside the hollow interior of the stator assembly such that a first annular space is formed between said first rotor end element and said first stator end element, a second annular space is formed between said second rotor end element and said second stator end element, and a central annular space is formed between said central rotor element and said central stator element, which rotor assembly rotates about an axis of rotation to various valve index positions in accordance with said previously determined cycle, where said axis is the longitudinal axis of both the rotor and stator assemblies, and which rotor assembly has a plurality of interior channels communicating between fluid passages formed in said annular spaces in order to transfer fluids between said fluid passages; (c) a plurality of nozzles for connection of said conduits to the valve, the nozzles being attached to the stator assembly and providing fluid paths between the conduits and said annular spaces inside the stator assembly; and (d) sealing means in said annular spaces for prevention of external leakage, definition of said fluid passages, and prevention of intermixing of fluids flowing through the valve, such that different pairs of nozzles communicate at each valve index position, in accordance with said previously determined cycle, and such that fluid supplied by a nozzle passes through, in sequence, one of said annular space fluid passages, a rotor assembly channel, and another of said annular space fluid passages before entering another nozzle to flow out of the valve.

Among the unique features of particular embodiments of the present invention are fluid flow paths denoted herein as tie pipes and central stator element passageways. These fluid flow paths enhance the flexibility of an axial multiport rotary valve, so that it can accommodate various process arrangements requiring interconnection of a plurality of conduits. Tie pipes communicate between annular volumes formed between rotor and stator end elements. Central stator element passageways permit fluid to enter the valve through a nozzle attached to the stator central element and exit through another nozzle attached to the stator central element, thus by-passing the end elements of the valve.

BACKGROUND OF THE INVENTION

Figure 11:
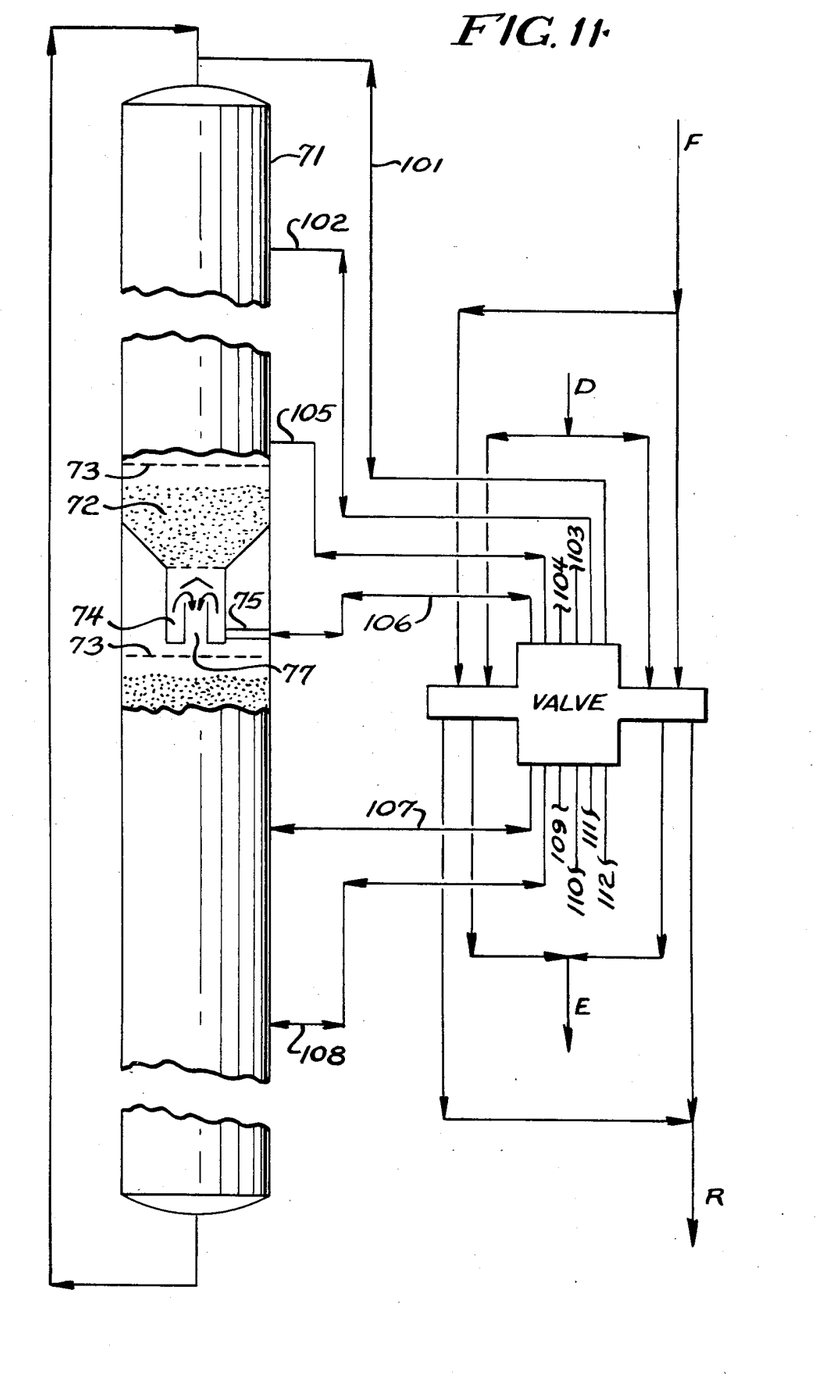
FIG. 11 is a schematic depicting the Broughton process (U.S. Pat. No. 3,985,589), showing a vessel containing a plurality of beds with conduits connecting the beds and an axial multiport rotary valve and conduits for streams entering and leaving the process.

The separation of various substances through selective absorption using a simulated moving bed of adsorbent is an example of a process in which an axial multiport rotary valve is useful. Simulation of a moving adsorbent bed is described in U.S. Pat. No. 2,985,589 (Broughton et al.), which is mentioned above. FIG. 11 depicts process and apparatus of this patent. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be simply described as dividing the bed into a series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits.

There are many different process requirements in moving bed simulation processes, resulting in different flow schemes and thus variations in rotary valve arrangement. For example, in addition to the four basic streams described in Broughton (2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton (2,985,589). It may be desirable to pass fluid through a bed or beds in the reverse direction from normal flow. This is commonly known as backflushing, a subject treated in U.S. Pat. No. 4,319,929 (Fickel). Other applications for various arrangements of multiport rotary disc valves may be seen in U.S. Pat. Nos. 4,313,015 (Broughton); 4,157,267 (Odawara et al.); 4,182,633 (Ishikawa et al.); and 4,409,033 (LeRoy).

Multiport rotary disc valves of the general arrangement shown in the above-mentioned patents (3,040,777 and 3,422,848) have been fabricated in various sizes up to valves utilizing 4½ foot diameter rotors. These valves have seven concentric circumferential grooves, or tracks, and 24 ports spaced around the periphery of the stator. A single valve of this size weighs approximately 26,000 pounds, has an overall height of about 15 feet, and occupies a plan area of approximately 8½ by 8½ feet. These figures do not include a separate hydraulic power unit used with the hydraulically driven actuator mounted on the valve proper. It can be appreciated that it is desirable to use apparatus of less bulk and weight to accomplish the same functions; the present invention provides such a smaller rotary valve. It is capable of accomplishing the interconnection of conduits in two groups and has further utility as discussed in the paragraphs immediately following.

While the multiport rotary disc valve of Carson (3,040,777) provided a satisfactory valve design for the simultaneous interconnection of two independent groups of conduits such that each conduit of the first group could be brought into individual communication with every conduit of the second group, it is not suitable when three groups of conduits must be simultaneously interconnected in the same manner. Upon reference to Broughton (2,985,589), it can be seen that there are only two groups of conduits which need to be interconnected when the arrangement of the drawing of that patent is utilized. One group consists of the conduits which provide the flows entering and leaving the simulated moving bed adsorbent system, that is, the flows which are switched among the beds, such as the feed stream. A second group consists of the conduits associated with the individual beds, that is, which supply and remove fluid from the beds, one conduit being connected between each two beds. It is to be noted that each conduit of the second group serves that dual function of supply and removal, so that it is unnecessary to provide conduits for supplying fluid separate from those for removing fluid.

When it is necessary to simultaneously interconnect conduits of three different groups of conduits in accordance with a previously determined cycle, the apparatus of the present invention may be used. An example of a process involving three conduit groups may be found in U.S. Pat. No. 4,402,832 (Gerhold), which is described below. As mentioned above, it is highly desirable to use a single device to do so, thereby avoiding the obvious problems associated with numerous separate valves which must be simultaneously actuated.

BRIEF DESCRIPTION OF THE DRAWINGS

FIG. 3 depicts an axial multiport rotary valve with tie pipes and with labels referring to the process of FIG. 1. Section arrows 35 show how FIG. 8 is taken. Central details are omitted for the sake of drawing convenience.

DETAILED DESCRIPTION OF THE INVENTION

Figure 1:
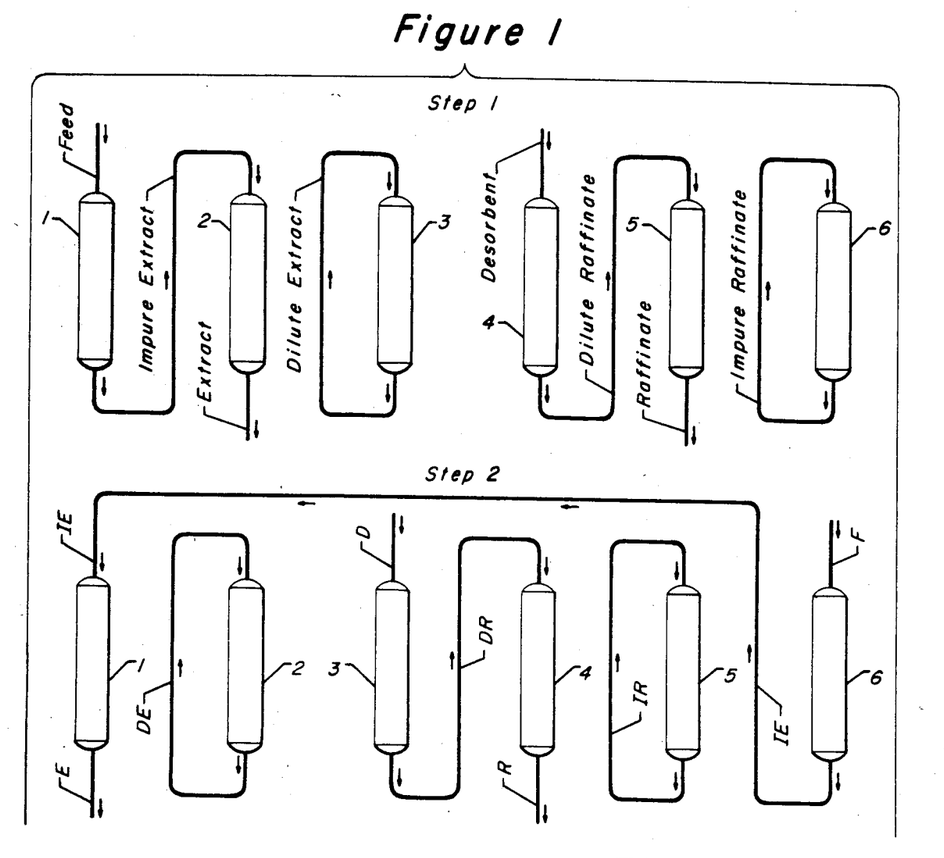
FIG. 1 depicts in schematic form six separation zones, or units, with two different fluid flow arrangements, where each arrangement is that associated with a single step of the process of U.S. Pat. No. 4,402,832 (Gerhold).
Figure 9:
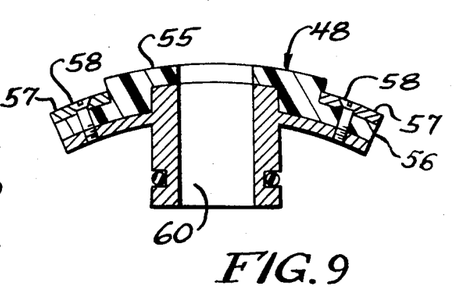
FIG. 9 is a section view of a central seal element taken as shown by section arrows 9 in FIG. 10.
Figure 10:
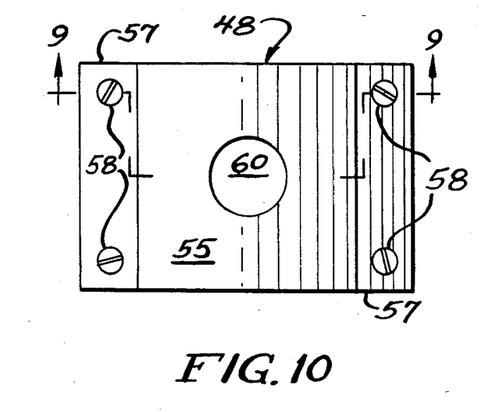
FIG. 10 is a top view of the central seal element of FIG. 9.

Following is a description of the embodiment of the invention shown in FIGS. 1 through1 10. It is not intended that such description be construed as limiting the scope of the invention in any way; the description of this example is merely a convenient means to become familiar with the invention. The elements of the invention may be arranged to form other embodiments and more or fewer conduits than shown in these drawings may be accommodated.

FIG. 1 depicts an exemplary processing system which will be used ind describing the invention. This processing system is described fully in the previously mentioned U.S. Pat. No. 4,402,832 (Gerhold) and it is only necessary to describe herein, in order to understand the present invention, the required fluid flow arrangement and cycle, further details being available from the patent. As depicted in FIG. 1, there are six individual separation zones, or units, denoted by reference numbers 1 through 6. There are conduits carrying four fluid streams, two streams entering the processing system and two leaving the processing system (as denoted by the arrows), labeled feed, extract, desorbent, and raffinate. These four streams may be called process flows or process streams. The manner of interconnection of the separation units by means of conduits carrying several fluid streams varies in order to simulate movement of the units in a direction cocurrent with the fluid flow.

There are six steps in a complete cycle, i.e., six different interconnection arrangements to be accomplished by the valve. Two of the steps are shown in FIG. 1 and from these two, the other four steps are easily understood. As the process, or valve, is indexed through each step of the cycle, each of the labeled streams is moved to a different separation unit. The streams may be visualized to move toward the left in FIG. 1 in order to simulate movement of the separation units to the right. During step 1, feed is provided to unit 1, impure extract is removed from unit 1 and flows to unit 2, dilute extract is recycled from the outlet to the inlet of unit 3, desorbent is provided to unit 4, dilute raffinate flows from the bottom of unit 4 to the top of unit 5, and impure raffinate is recycled at unit 6, as shown in step 1 of FIG. 1. At the end of the step 1 time period, the valve indexes, or rotates, to its step 2 position, in which feed is routed to unit 6, impure extract is removed from unit 6 and routed to unit 1, and so forth, as shown in step 2 of FIG. 1. In step 2, abbreviations are used, such as IE for impure extract; their meanings are made clear by reference to the labels of step 1, referring to the first letters of the words. It can now be understood that in step 3, feed will be routed to unit 5 and corresponding changes will be made in the origins and destinations of the other streams. During step 6, feed will be routed to unit 2 and upon the next step, return to unit 1, the cycle being repeated indefinitely.

Figure 2:
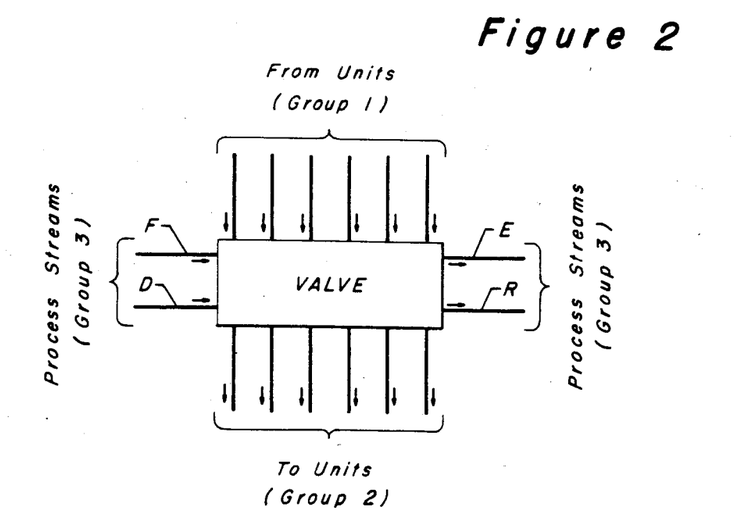
FIG. 2 is a schematic representation of a valve and conduits to be interconnected by its use as required by the process of FIG. 1.

FIG. 2 depicts the valve as a box and shows the streams of FIG. 1 as arrows entering and leaving the box. Each arrow may be viewed as a conduit, or pipeline, the direction of flow being as shown. Thus there are six conduits conveying fluid to the valve, one communicating with the outlet of each separation unit and six conduits conveying fluid away from the valve, one communicating with the inlet of each separation unit. In addition, there are four conduits to accommodate the process flows discussed above, labeled with F for feed, etc. The conduits connected to the valve may be placed in three groups: process flows, unit ins, and unit outs.

Figure 3:
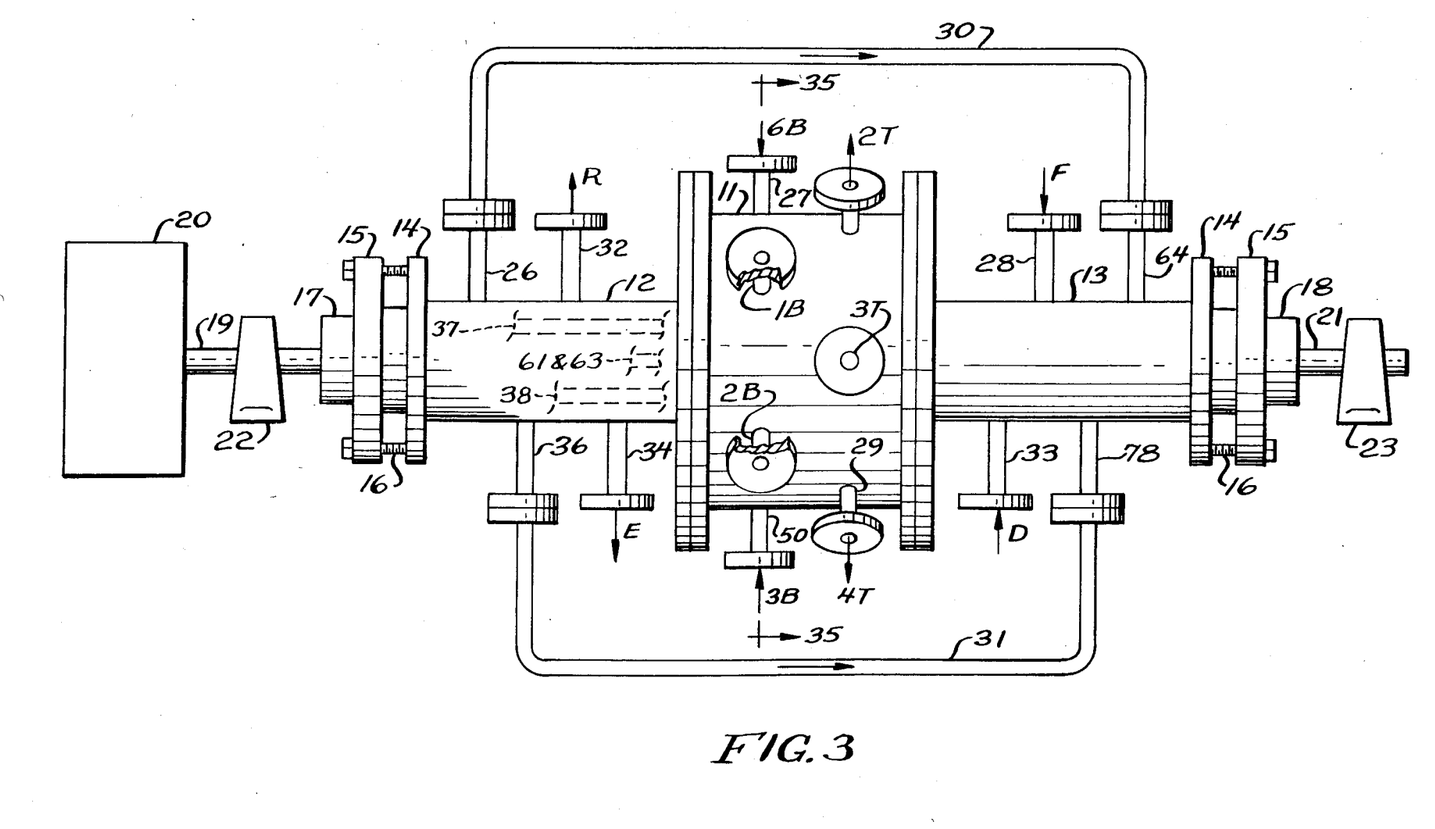

Referring to FIG. 3, a hollow stator assembly is comprised of central element 11, end element 12, and end element 13. In this embodiment of the invention, the end elements of the stator assembly are bolted to the central element (bolts not shown for drawing convenience). A rotor assembly, also comprised of a central element and two end elements is located substantially within the hollow interior of the stator assembly. Either assembly, rotor or stator, may be separable into parts independent of the terminology used herein; the use of the word elements is not intended to convey that the assembly must be separable into the three elements described. Each of the rotor and stator elements is cylindrical in form. In this embodiment, the central elements are larger in diameter than the end elements; this is not necessarily the case in other embodiments. Size is determined by the number of fluid streams passing through the valve, their routing, and their magnitude, as well as by mechanical considerations. Only a portion of each rotor end element is shown in FIG. 3. Rotor end element 17 projects out of stator end element 12 and rotor end element 18 projects out of stator end element 13. Attached to the rotor are shafts denoted by 19 and 21, and the rotor is supported in bearing assemblies 22 and 23. Means for rotating the rotor assembly about an axis of rotation are denoted by reference FIG. 20. The axis of rotation is the extended center line of shafts 19 and 21, or the longitudinal axis of both assemblies. In this particular example, the rotor is rotated in 60° increments, with any one of six rest positions of the rotor being defined as a valve index position and representing the rotor position at, or during, a single cycle step. Such means for indexing a shaft, or rotating it in increments of usually less than a full rotation, are well known and may be characterized broadly as hydraulic, electrical, or electromechanical. An example of means for rotating may be found in U.S. Pat. No. 2,948,166 (Purse et al.)

Each stator end element has a flange 14, to which seal ring followers 15 are attached by bolts 16. The function of the seal ring followers is discussed below. A plurality of nozzles such as 26 and 27 are attached to the stator and provide fluid passages between the interior of the stator and conduits which are connected to the nozzles. The nozzles may be divided into four sets depending on their location on the stator assembly. Nozzle 26 is representative of nozzles in a first set located on one stator end assembly, in this case, the end element shown on the left. Nozzle 28 is representative of a second set of nozzles located on another stator end element, depicted on the right in FIG. 3. A third set of nozzles is attached to the central stator element adjacent to the left stator end element and includes nozzle 27. Nozzle 29 is representative of a fourth set of nozzles attached to the central stator element adjacent to the right stator end element. Stator tie pipe 31 connects nozzles 36 and 78, providing a fluid passage between those nozzles. Likewise, stator tie pipe 30 provides a passage for the flow of fluid between nozzles 26 and 64. Section arrows 35 show the manner in which the views of FIG. 8 are taken.

The labels of FIG. 3 are the same as those of FIGS. 1, 2, and 8. The letters (those without numbers) correspond with the abbreviations of FIGS. 1 and 2, e.g., F denotes the feed stream. All of the conduits discussed in connection with FIGS. 1 and 2, sixteen in number, are connected to the stator assembly by means of nozzles, though not all of the nozzles are shown in FIG. 3. There are six nozzles in the third set, which includes nozzle 27. Two of the nozzles of the third set are not visible in FIG. 3; they are located in positions on the back of the stator central element. The nozzles of the third set are equally spaced around the stator central element, 60° apart and their center lines are all in a single plane normal to the axis of rotation. The nozzles of the fourth set are arranged in a manner similar to the third set. Only three fourth set nozzles can be seen in FIG. 3.

Again referring to FIGS. 1, 3, and 8, the labels 1T through 6T and 1B through 6B refer to a particular separation unit and a particular conduit attached to that unit. For example, 1T indicates that the conduit attached to that nozzle communicates between that nozzle and the top of separation unit 1 and 3B indicates that the conduit attached to that nozzle communicates between that nozzle and the bottom of separation unit 3. The nomenclature "top" and "bottom" is used for convenience only, because in FIG. 1, the inlets to the separation units are shown at the top of the drawing.

Figure 4:
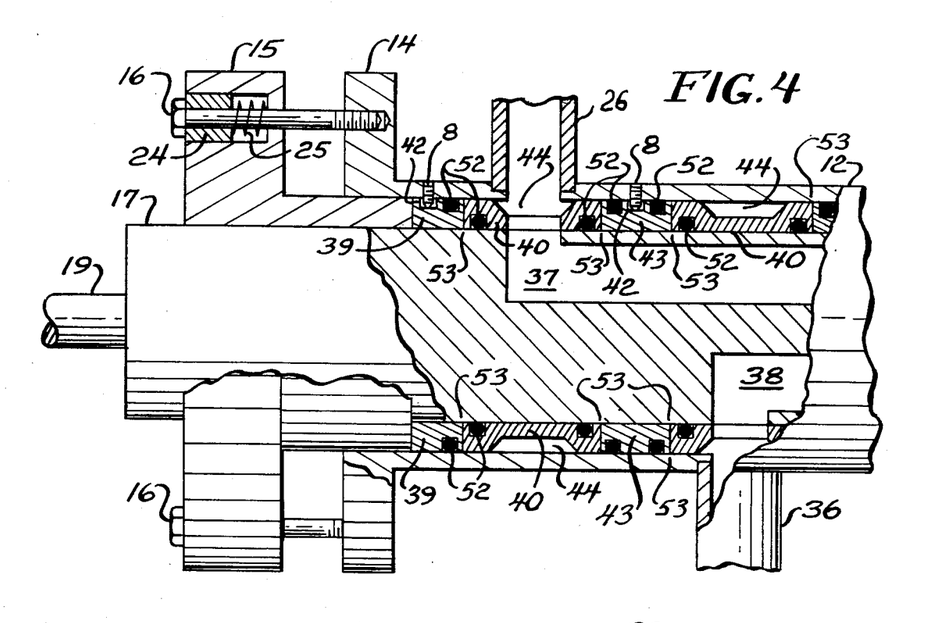
FIG. 4 is a partial sectional view of the left hand end of the valve of FIG. 3, including a portion of a stator end element, a portion of a rotor end element, and a seal ring follower. Certain details are omitted for the sake of drawing convenience.
Figures 5, 7:
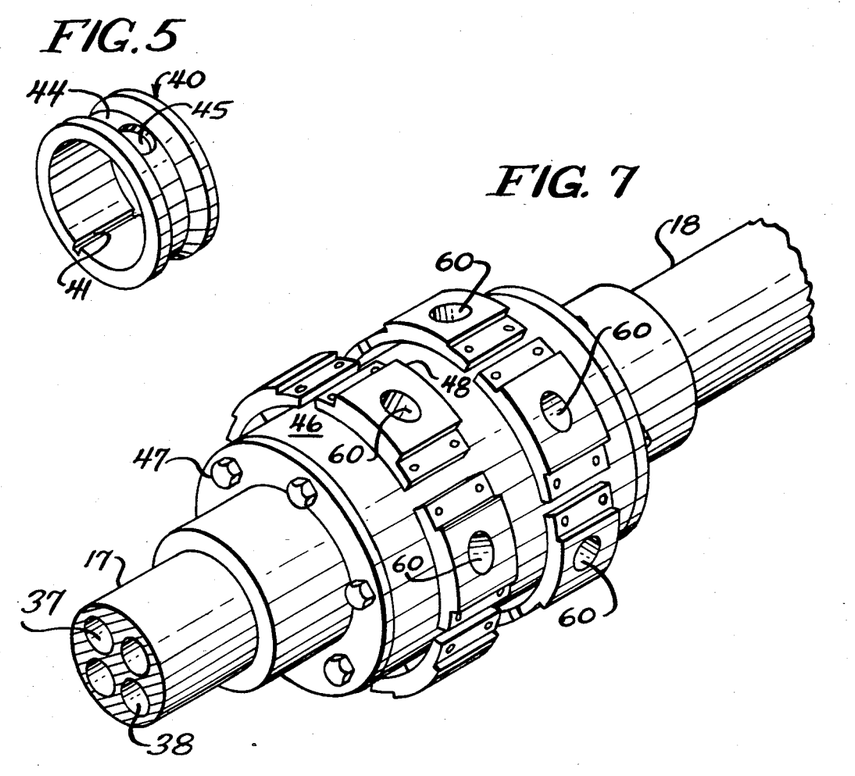
FIG. 5 depicts a rotating seal ring with O-rings omitted.
FIG. 7 shows a stator central element with portions of the stator end elements and with central seal elements in place on the central element. This is configured for use in the valve of FIG. 3.

Now referring to FIG. 4, the applicable reference numbers of FIG. 3 are used. Rotor end element 17 is located substantially inside stator end element 12. Nozzles 26 and 36 of FIG. 3 are shown in FIG. 4. Two interior channels 37 and 38 are shown in rotor end element 17. There are two additional channels (not shown) in rotor element 17 and all four channels, which comprise a first group, extended into the rotor central element (which is not shown in FIG. 4). Channel 37 communicates with nozzle 26 and channel 38 communicates with nozzle 36. Stator end element 12 has a larger inside diameter than the outside diameter of rotor end element 17, thus forming an annular space, or annular volume, between the elements. As shown in FIG. 4, this annular space is filled with seal rings. In contact with the portion of seal ring follower 15 which projects into the annular volume is an end seal ring 39. Adjacent to end seal ring 39 is a rotating seal ring 40 and next to that is a stationary seal ring 43. Another rotating seal ring 40 is adjacent to stationary seal ring 43 on the other side. FIG. 5 shows a single rotating seal ring 40. In a similar manner, an annular space is formed between rotor end element 18 and stator end element 13 (FIG. 3) and also between the rotor central element and the stator central element.

All of the nozzles communicate with the annular spaces between the rotor assembly and the stator assembly. The seal rings are means by which fluid passages in the end element annular spaces are defined, intermixing of fluids in the annular spaces is prevented, and external leakage is prevented. For example, fluid flowing in channel 37 and nozzle 26 is separated from fluid in channel 38 and nozzle 36 by the seal rings. Rotating seal ring 40 extends circumferentially around the rotor end element and is configured such that annular passage 44 is formed in a portion of the annular space between the stator and rotor end elements, between the inside wall of the stator end element and the outside surface of ring 40. FIG. 5 shows an entire seal ring. Note that O-rings 52 are omitted from the inner surface of the seal ring depicted in FIG. 5. An aperture 45 (FIG. 5) in seal ring 40 is aligned with channel 37 and permits fluid to flow between channel 37 and annular passage 44. Since annular passage 44 is circumferential, extending 360° around the rotor assembly, the passage is always in communication with nozzle 26, thereby nozzle 26 and channel 37 are always in communication. Similarly, each of the other channels of the left rotor end element are always in communication with a particular nozzle attached to the left rotor end element (nozzles 32, 34 and 36). An O-ring 52 is located on each side of the ring 40, as shown in FIG. 4, to prevent fluid from the aperture 45 and the annular passage 44 from flowing in a longitudinal direction parallel to the axis of rotation along the outside surface of the rotor end element and the inside surface of the ring 40.

End seal ring 39 does not rotate and is held in place by means of a set screw 8 inserted through the wall of the stator element and projecting into cavity 42. Rotating seal rings 40 are attached to the rotor and rotate with it. Attachment is accomplished by means of a groove 41 (see FIG. 5) in each rotating seal ring 40. There is a tongue (not shown) which matches the grooves on the end element for each seal ring 40. When tongue and groove are engaged, the seal ring is locked in place. Stationary seal ring 43 is prevented from rotating by means of a set screw in the same manner as end seal ring 39. O-rings 52 prevent fluid leakage between the rotor end element and rotating seal rings 40, as described above, and between the stator end element and the stationary seal rings 43 or end seal ring 39, in the same manner. Leakage does occur between the wall of the stator and rotating seal ring 40. This leakage lubricates and is contained at seal interface 53 which extends 360° around the rotor end element and is in a plane perpendicular to the axis of rotation. The sealing surfaces at interface 53 may be any of the well-known materials used in applications where a stationary seal face bears against a rotating seal face. For example, a common pair of seal face materials are carbon and tungsten. Seal ring 40 may be fabricated entirely of tungsten and rings 39 and 43 may be fabricated entirely of carbon, or carbon and tungsten may be applied to other base ring materials solely to form the sealing surfaces at interface 53.

Figure 6:
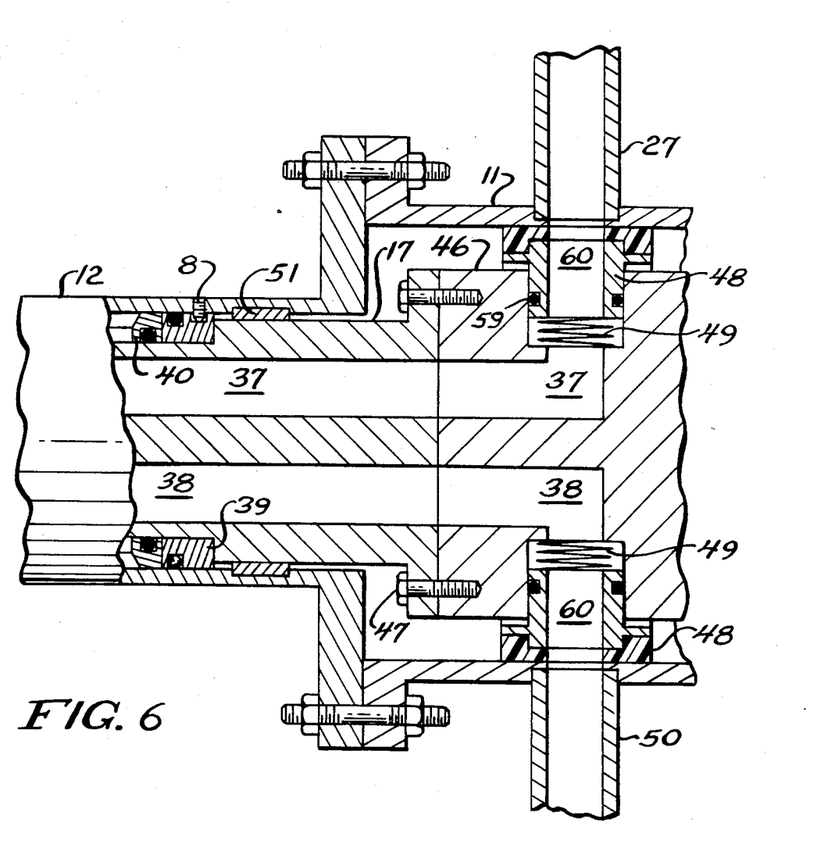
FIG. 6 is a partial sectional view of the valve of FIG. 3, including portions of rotor and stator end elements and central elements. Certain details are omitted for the sake of drawing convenience.

The complete arrangement of the left rotor end element may now be understood. A seal ring 40 is located at each of the four nozzles of stator end element 12. Between the rotating seal rings are located stationary seal rings 43. There are three stationary rings at each end element. At each end of the annular space formed by the left end elements is an end seal ring 39. The rotor end element shown on the right in FIG. 3 is arranged in the same manner. Only one end of the annular space between end elements can be seen in FIG. 4. The other end is shown in FIG. 6, where it can be seen that the assembly of seal rings is retained by a shoulder on the rotor which is adjacent to rotor sleeve 51. At the other end, the assembly of rings is held in place by seal follower 15 (FIG. 4). Also, sealing force is applied to the sealing surface interfaces by means of seal follower 15. A spring 25 is provided at each bolt 16. Spacers 24 enable spring 25 to be compressed by turning bolts 16 and, therefore, urge seal follower 15 toward the stator central element, thereby providing sealing force.

FIG. 6 shows the other end of stator element 12 and rotor end element 17 and also a portion of stator central element 11 and a portion of the rotor central element 46. Rotor central element 46 and rotor end element 17 are fastened together by means of bolts such as 47. Rotor sleeve 51 provides spacing between stator element 12 and rotor element 17 and serves as a bearing. Channels 37 and 38 communicate with an annular space between rotor central element 46 and stator central element 11.

Fluid flows between nozzle 27 and channel 37 and nozzle 50 and channel 38. Definition of fluid passages and prevention of intermixing, in the central element annular space, of these streams and others is accomplished by means of rotor seal elements 48. FIG. 9 shows a section view of a single rotor seal element 48. FIG. 10 shows a top view, including the sealing surface, of rotor seal element 48. FIG. 7 depicts rotor central element 46 with several seal elements 48.

The arrangement of the left portion of the valve of FIG. 3 is described in detail; the right portion of the valve, comprising rotor and stator end elements and right hand portions of the rotor and stator central element is similar. FIGS. 4 and 6 in a mirror image configuration would depict the right hand portion of the valve.

FIGS. 6, 7, 9, and 10 should be consulted for the following explanation. A rotor seal element is located at the central element end of each channel and at each end of each passageway (discussed below) in the rotor central assembly. These seal elements define fluid passages and prevent intermixing of fluids in the central annular space. In this embodiment, there are twelve rotor seal elements 48, eight for channels and four for passageways. Reference FIG. 60 denotes the fluid passage. A length of cylindrical conduit which comprises an elongated cylindrical portion of a rotor seal element 48 is located within a portion of channel 37. That portion of channel 37 has a larger diameter than other portions of the channel such that a shoulder is formed to retain spring 49 (FIG. 6). Each rotor seal element is provided with O-ring 59 around its outer circumference to prevent leakage between the annular space and the wall of the channel. A curved rectangular plate portion is attached to the cylindrical portion and is covered by rotor seal element seat 56 (FIG. 9). Spring 49 presses sealing face 55 against the inner surface of stator central element 11, which is smooth and polished to prevent leakage at the inside wall of the stator central element. Sealing face 55 is a portion of rotor seal element seat 56, which is formed of a soft elastomeric material. Rotor seal element seat 56 is held in place by means of two retainers 57 and four screws 58. Rotation of the rotor assembly results in wear at surface 55, as a result of the movement of the surface around the interior wall of the stator central element. Spring 49 provides sealing force and will maintain it as wear occurs, but periodically rotor element seat 56 will need to be replaced. The movement of rotor seal element 48 in the enlarged portion of channel 37 is relatively small and such movement does not affect the sealing ability of O-ring 59.

Referring now to FIGS. 4 and 6, it can be seen that channels 37 and 38 are comprised of three sections. One section is perpendicular to the axis of rotation and located wholly in the rotor end element. One section is parallel to the axis and located both in the rotor end element and the rotor central element. One section is perpendicular to the axis and located wholly within the rotor central element. The other six channels (for a total of eight channels) of this embodiment are similar.

In FIG. 8, all of the nozzles of sets 3 and 4 are shown. Nozzles 1B through 6B are shown in section and are uniformly spaced every 60° around stator central element 11 in a single plane. 1T through 6T, the nozzles connected by conduits to the tops of the separation zones, or units, as shown in FIG. 1 are arranged in a similar manner but are offset by 30° from the third set of nozzles. In this embodiment, the 30° offset exists only for reasons of convenience in connecting conduits to the stator central element and to permit the central elements to be shorter than they would be if the nozzles were not offset by 30°, but were side by side. For example, if nozzles 29 and 50 (FIG. 3) were both at the bottom, piping flanges at nozzle 29 could interfere with flanges at nozzle 50. The direction of rotation of the rotor assembly is shown by arrow 62.

The complete fluid transfer paths may now be understood. For example, in step 1 of the six-step cycle, raffinate (R) leaves the process system by means of nozzle 32 (FIG. 3), having entered the valve by means of the nozzle labeled 5B, (FIG. 8, step 1), which is connected by a conduit to the bottom of separation unit 5, and having passed through channel 61 to nozzle 32. In step 2 of the process, R flows from separation zone 4 (FIG. 1, step 2) and, therefore, enters the valve through the nozzle labeled 4B. Since the rotor has indexed 60° from step 1 to step 2, nozzle 4B is aligned with channel 61 and the raffinate flows through channel 61 to nozzle 32. In steps 3, 4, 5, and 6, raffinate flow is switched in a similar manner, as has been discussed above. Between each end of channel 61 and the nozzles, raffinate flows into annular spaces, one between the central elements and one between end elements. The flow is contained and prevented from intermixing with other flows through the valve by the sealing means described above.

In a further example of fluid flow paths through the valve, 1R from the bottom of separation unit 6 (FIG. 1, step 1) enters the valve through nozzle 27 (FIGS. 3, 6, 8) and flows to nozzle 26 via channel 37 (FIGS. 3 and 4). From nozzle 26, it flows to nozzle 64 (FIG. 3) via stator tie pipe 30, or tie conduit 30 (FIG. 3). A tie pipe is used herein to mean a conduit which connects and communicates between two nozzles of a valve. Impure raffinate then flows from nozzle 64 to nozzle 65 (FIG. 8, step 1) via a channel (not shown) in the right rotor end element and the right portion of the rotor central element. Nozzle 65 is connected to a conduit which routes the stream to the top of separation zone 6. In step 2 of the cycle, the rotor indexes so that impure raffinate from separation unit 5 flows into channel 37.

It can be seen that nozzles of the first set communicate with third set nozzles by means of channels in the first group, passages in the left hand annular space between end elements, and passages in the central annular space. Nozzles of the second set communicate with fourth set nozzles in a similar manner, the flow paths including channels in a second group of channels.

Referring to FIG. 1, it can be seen that a conduit containing impure extract from the bottom of separation unit 1 must be connected with a conduit feeding separation unit 2. This is accomplished by means of passageway 66 in the rotor central element. Referring to FIG. 8, step 1, passageway 66 is located wholly within the rotor central element and connects nozzles 67 and 68. Passageway 66 consists of three portions. A first end portion is in register with nozzle 67, as can be seen in step 1 of FIG. 8. A second end portion cannot be seen in FIG. 8, but is identical to the first portion in configuration and is in register with nozzle 68. The third portion of passageway 66 connects the first two portions and is perpendicular to them. The third portion may be drilled from one face of the rotor central element while the end element is disconnected from the central element and then the first portion of the drilled hole, adjacent to the end of the central element, can be plugged. Rotor seal elements 48 are used in the annular space and the ends of passageway 66 in the same manner as in the ends of the channels. In step 2 of the cycle, passageway 66 provides a flow path between nozzles 27 and 69, and so forth for the other cycle steps. In the same manner, passageway 70 provides a flow path between separation units 4 and 5 at step 1, etc. Passageways 66 and 70 permit nozzles in the third set to communicate with fourth set nozzles.

In this example, where the fluids flowing in the process are liquids, pumps are required at certain locations. For example, referring to step 1 of FIG. 1, a pump is needed to transfer dilute extract from the bottom of unit 6 to the top of unit 6. This pump may be physically located in tie pipe 30. In step 2 of the cycle, as can be seen from FIG. 1, this same pump could be used to transfer liquid 5B and 5T. Alternatively, a single pump could be associated with each column and used only when necessary to pump a stream associated with that column. No further mention of apparatus such as pumps and compressors used to transfer fluid need be made, as those familiar with chemical processing are able to appropriate when such apparatus is required and where in the process it needs to be located.

Figure 12:
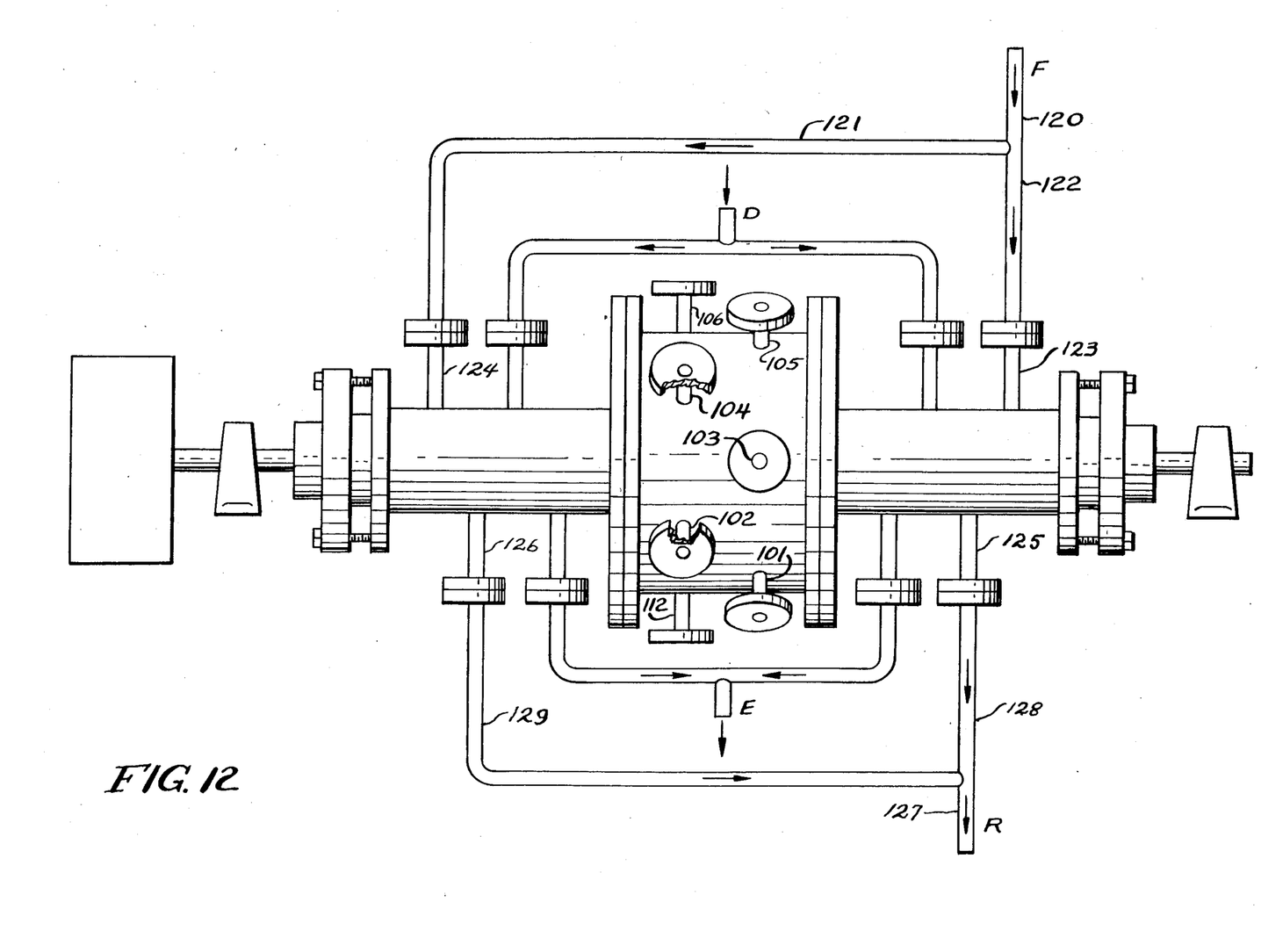
FIG. 12 depicts an axial multiport rotary valve with certain nozzles labeled to refer to the process of FIG. 11 (the Broughton process) and depicting conduit arrangement in the same manner as FIG. 11. Since the valve is otherwise identical to that of FIG. 3, valve component reference numbers have been omitted.

FIGS. 11 and 12 present an example in which a valve is used to interconnect a plurality of conduits in two groups. The process depicted is that of Broughton (U.S. Pat. No. 2,985,589). An explanation of the process is presented above and supplemented in the following paragraphs. The explanation of this example need not be as detailed as that of the previous example, since the basic principles of the invention are known from the previous example. This example is not intended to limit the scope of the invention. There are twelve beds in vessel 71; one bed 72 is shown in the cutaway portion of FIG. 11. The bed 72 is retained by bed support means at the bottom of the conical section. Liquid is distributed evenly over the top of the bed by distributor 73, which may be a perforated plate. Liquid which flows through the bed is collected in reservoir 74. If liquid is to be removed from reservoir 74, it will flow out through an internal conduit 75 which communicates between the reservoir and a conduit 106 external to vessel 71. Conduit 106 carries liquid to the valve. If liquid is not to be removed, the flow path is blocked in the valve and liquid overflows the reservoir and passes through downcomer 77 to another distributor 73, to be distributed over the next lower bed. If liquid is to be added, it flows in from the valve through conduit 106 and is distributed over the next lower bed in the same manner as liquid flowing throuh bed 72.

There are four basic streams whose connection points to vessel 71 and the beds therein are changed at each cycle step. They are labeled in the same manner as the process of FIG. 1; F denotes feed, etc. Since there are twelve beds, liquid flows to or from any given bed only every third cycle step. For example, liquid flows in conduit 106 every third step and during the other two steps, all liquid flows through downcomer 77. Consider that the beds are numbered from B1 through B12, starting at the top of vessel 71. Bed 72 is B6. Twelve conduits most then connect the vessel and the valve. These are depicted by the twelve lines denoted 101 through 112 connected to the larger central portion of the valve symbol, this larger portion of the symbol representing a stator central element. Consider that at cycle step 1, feed (F) flows to bed B6. Then raffinate (R) will flow from bed B9, desorbent (D) will flow to bed B12, and extract (E) will flow from bed B3, all in step 1. During step 2, F will flow to B7, R from B10, D to B1 and E from B4. The flows will sequence in a similar manner through the balance of the twelve steps of the cycle and then repeat.

The twelve conduits, 101 through 112, are connected to twelve nozzles attached to the stator central element in the same configuration as the earlier example presented herein. As in that example, five of the conduits do not appear in the drawing of the whole valve (FIG. 12). The nozzles of FIG. 12 are labeled 101 through 106 and 112 to indicate the conduits connected to them, e.g., bed B6 is served by conduit 106. There are three significant differences between the embodiment used in this example and that described above in connection with the Gerhold process (4,402,832) example. There are no passageways such as 66 and 70, in the rotor central element. Tie pipes are not required. The third difference is that the rotor assembly of this embodiment rotates in 30° increments to accommodate the twelve cycle steps. As in the Gerhold process example, there are four nozzles attached to each rotor end element. Each of the four basic streams is routed to each end element. For example, feed (F) in conduit 120 (FIG. 12) is supplied to each end element by means of conduits 121 and 122, which branch off from conduit 120. At cycle step 1, F enters the valve through nozzle 124 and passes out of the valve through nozzle 106. At cycle step 1, F entering the valve through nozzle 123 flows no farther than the seal element in the annular space between the rotor and stator central elements, because the central element nozzle is not aligned with any of the four channels in the right rotor end element. At cycle step 2, the rotor assembly having indexed through 30°, F flows into nozzle 123, through a channel in the right end rotor and right portion of the rotor central element and out of the valve by means of nozzle to which conduit 107 (FIG. 11) is attached. Conduit 107 provides the feed stream to bed B7. During step 2, F which enters the valve through nozzle 124 is blocked in the same manner as in step 1, i.e., the channel end in the left portion of the rotor central element is blocked by the stator central element wall. The other basic flows, D, E and R, are routed in a similar manner. Note that in this embodiment, the passageways shown in FIG. 8 do not exist, so there are always two nozzles on the left and two on the right side of the central element not in alignment with any channel, even when the other 4 nozzles are in alignment. Thus, during any one cycle step, none of the nozzles on one of the two sides of the central element are in communication with a channel and only 4 of the 6 nozzles on the other side are in communication with a channel, so that fluids are flowing in only 4 nozzles at any one time.

Means for sealing other than the seal rings described above may be used. The annular space between end elements may be filled with conventional shaft packing and compressed by means similar to seal ring follower 15. Stationary lantern rings may be used in place of the rotating seal rings to provide fluid flow passageways analogous to annular passage 44. Another alternate to the above-mentioned seal rings is lip-type seals. These might be used alone or in conjunction with rings spaced along the shaft to aid in defining fluid passages, such rings being identical in configuration to a stack of flat washers. In a similar manner, there are alternates to the use of rotor seal elements 48, such as lip-type seals or a plastic liner having self-lubricating properties. A liner could be of tetrafluoroethylene, either reinforced or non-reinforced, having apertures in appropriate locations to allow fluid to flow. Rigid retaining means might be provided at various points so that any tendency of the liner to "creep" is minimized.

In each of the above examples, there have been four nozzles each in the first and second sets of nozzles and six nozzles each in the third and fourth sets. Of course, valves having different numbers of nozzles, to accommodate more or fewer conduits, can be designed. Varying numbers of tie pipes can be used to connect nozzles of various groups, depending on the flow pattern required in any particular process. It may be necessary to place pipe expansion joints in the tie pipes, if tie pipes are used, to prevent damage to the valve and/or leakage due to expansion caused by high temperature fluids flowing through the valve. As discussed above, it may be desirable to utilize flushing fluids; nozzles and channels can easily be provided for this purpose. When a rotary valve is referred to as indexing, it is meant that the rotor assembly is moving. A valve index position refers to one of the positions of a rotor assembly which is stationary and where openings are in register. The components of the present invention may be fabricated from suitable materials of construction, such as metals or plastics. Sizing of the flow passages is easily accomplished by reference to any of the numerous standard methods which are available.

To illustrate valve dimensions, a rotor assembly only for a valve suitable for use in the Gerhold process discussed above with six separation units and moderate fluid flow rates requiring 1½-inch diameter channels may have a total length of 42 inches, with a diameter of 5 inches at the end elements and 10 inches at the central element; total valve length including driving mechanism may be about 7 ft. A rotor end element having four 4-inch diameter channels to handle fluids at moderate pressures may have a diameter of 14 inches.

In the examples presented, nozzles have been shown as short lengths of conduit attached to, or located on, the stator assembly and having flanges for connection to the conduits to be interconnected by the valve. However, the term nozzle is used broadly to indicate means of communication between conduits and annular volumes. For example, if it is desired to connect conduits to a valve by means of welding, the term nozzle may refer to openings in the walls of the stator assembly, the stator wall being configured to accept welded-on conduits.

We claim as our invention:

1. An axial multiport rotary valve for accomplishing the simultaneous interconnection of a plurality of conduits in accordance with a previously determined cycle, where any conduit communicates, by means of the valve, with no more than one other conduit at any one valve index position, comprising:
   (a) a stator assembly having a hollow interior and being comprised of a central element, a first end element, and a second end element, each of said elements having a cylindrical form;
   (b) a rotor assembly comprised of a central element, a first end element, and a second end element, each of said elements having a cylindrical form, which rotor assembly is located substantially inside the hollow interior of the stator assembly such that a first annular volume is formed between said first rotor end element and said first stator end element, a second annular volume is formed between said second rotor end element and said second stator end element, and a central annular volume is formed between said central rotor element and said central stator element, which rotor assembly rotates about an axis of rotation to various valve index positions in accordance with said previously determined cycle, where said axis is the longitudinal axis of both the rotor and stator assemblies, and which rotor assembly has a plurality of interior channels;
   (c) a plurality of nozzles for connection of said conduits to the valve, the nozzles being located on the stator assembly and providing fluid paths between the conduits and said annular volumes inside the stator assembly; and
   (d) means in said annular volumes for definition of fluid passages which communicate with said interior channels of the rotor assembly, prevention of intermixing of fluids flowing through the valve, and prevention of external leakage, such that different pairs of nozzles communicate at each valve index position, in accordance with said previously determined cycle, and such that fluid supplied by a nozzle passes through, in sequence, one of said annular volume fluid passages, a rotor assembly channel, and another of said annular volume fluid passages before entering another nozzle to flow out of the valve.

2. The valve of claim 1 further comprising at least one passageway located wholly within the rotor central element, said passageway having a first end portion which is in register, at each valve index position, with a nozzle attached to the stator central element and a second end portion in register, at each valve index position, with another nozzle attached to the stator central element.

3. The valve of claim 2 further comprising means for definition of fluid passages associated with said first and second passageway end portions, so that at least one pair of nozzles attached to the central stator element communicate at each valve index position.

4. The valve of claim 1 further comprising at least one stator tie pipe and two nozzles, which tie pipe communicates between said nozzles and which nozzles are attached to said stator assembly and provide fluid passages between the tie pipe and said annular volumes inside the stator assembly.

5. The valve of claim 1 further characterized in that each of said plurality of interior channels in said rotor assembly is comprised of three portions, one portion which is perpendicular to said axis of rotation and located wholly in a rotor end element, one portion which is parallel to said axis and located both in a rotor end element and the rotor central element, and one portion which is perpendicular to said axis and located wholly within the rotor central element.

6. The valve of claim 1 further characterized in that said nozzles are divided into four sets of nozzles, a first set attached to said first stator end element, a second set attached to said second stator end element, a third set attached to said central stator element adjacent to the first stator end element, and a fourth set attached to the central stator element adjacent to the second stator end element, and said channels are divided into two groups, a first group containing channels having a portion located in the first rotor end element and a second group containing channels having a portion located in the second rotor end element, so that nozzles of said first set of nozzles communicate with nozzles of said third set by means of channels in said first group of channels, passages in said first annular volume, and passages in said central annular volume, and so that nozzles of said second set communicate with nozzles of said fourth set by means of channels of the second group, passages in said second annular volume, and passages in said central annular volume.

7. The valve of claim 1 further characterized in that said rotor central element has a larger diameter than said rotor end elements.

8. The valve of claim 1 further characterized in that said stator central element has a larger diameter than said stator end elements.

9. The valve of claim 1 further characterized in that said means in said annular volumes comprises a rotating seal ring attached to and extending circumferentially around a rotor end element, said ring having a height approximately equal to the width of said annular volume between rotor and stator end elements and having a length sufficient to contain an aperture and an annular passage, which aperture and annular passage provide a fluid flow path between a channel and a nozzle, said annular passage extending 360° around the ring and bounded on one side by a portion of inside surface of a stator end assembly and on the other sides by the ring, said ring having means for sealing to prevent fluid from said aperture and channel from flowing in a longitudinal direction parallel to said axis of rotation along the interface of the outside surface of the rotor end element and the inside surface of said ring, and said ring having two lubricated rotating seal surfaces extending 360° around the ring in planes perpendicular to said axis of rotation, where lubrication for said surfaces is provided by fluid leakage from said annular passage along the interface of outside surface of the ring and portions of the interior surface of the stator end element.

10. The valve of claim 1 further characterized in that said means in said annular volumes comprises a stationary seal ring attached to a stator end element and extending circumferentially around a rotor end element, said ring having a height approximately equal to the width of said annular volume between stator and rotor end elements, said ring having means for sealing to prevent fluid from flowing in a longitudinal direction parallel to said axis of rotation along the interface of the outside surface of the ring and a portion of inside surface of the stator end element, and said ring having at least one lubricated stationary seal surface extending 360° around the ring in a plane perpendicular to said axis of rotation, where lubrication for said seal surface is provided by fluid leakage from an annular volume fluid passage.

11. The valve of claim 1 further characterized in that said means in said annular volumes comprises a rotor seal element comprised of a length of cylindrical conduit at least partially located in and concentric with an enlarged diameter end portion of a channel, which enlarged portion is located wholly within a rotor central element and perpendicular to said axis of rotation, further comprises a curved plate sealably attached to and surrounding the exterior of said conduit at one end, said curved plate being perpendicular to the longitudinal axis of said conduit and having a radius of curvature substantially the same as that of the inside surface of the stator central element, further comprises means for sealing to prevent fluid flow in a direction parallel to the longitudinal axis of said conduit along the interface of the surface of the enlarged channel portion and the external surface of the conduit, and further comprises spring means to urge said curved plate into sealing contact with the inside surface of the stator central element to prevent fluid leakage along the interface of the curved plate and the stator central element inside surface, whereby fluid flows between a channel and a nozzle by means of said cylindrical conduit.

12. The valve of claim 11 further characterized in that said curved plate is at least partially covered with a plastic material, which is in sealing contact with the inside surface of the stator central element.

* * * * *